Nov. 16, 1965  E. M. BENTON  3,217,880
ELECTRO-SEPARATOR FOR SEPARATION OF DRY COMMINUTED MATERIAL
Filed Aug. 10, 1962  3 Sheets-Sheet 1

INVENTOR.
Earl M. Benton
BY WHITEHEAD, VOGL & LOWE
PER Frank C. Lowe
ATTORNEYS

Nov. 16, 1965　　　　E. M. BENTON　　　　3,217,880
ELECTRO-SEPARATOR FOR SEPARATION OF DRY COMMINUTED MATERIAL
Filed Aug. 10, 1962　　　　　　　　　　　　3 Sheets-Sheet 2
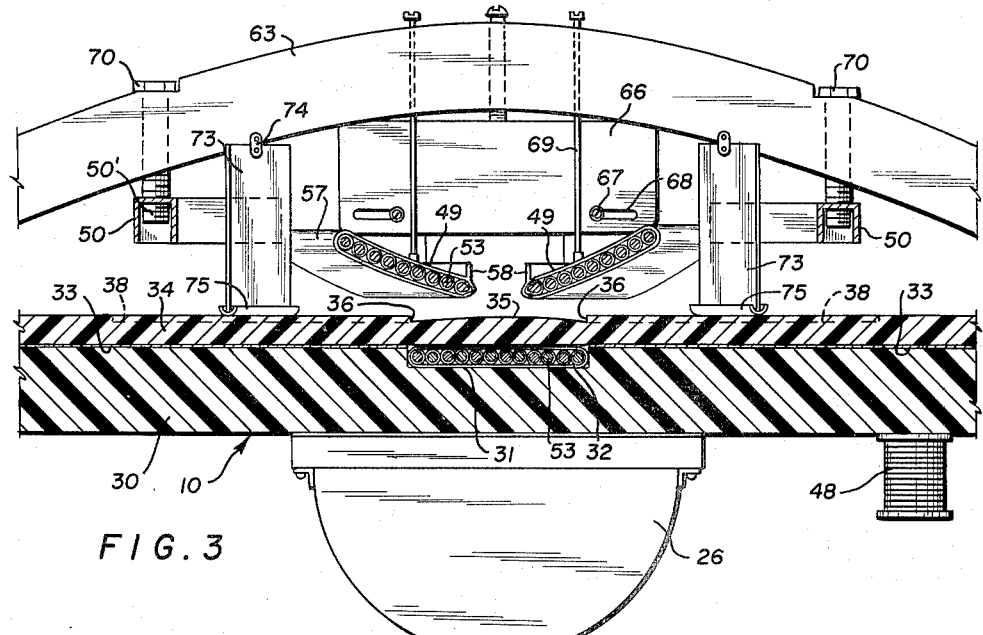
FIG. 3
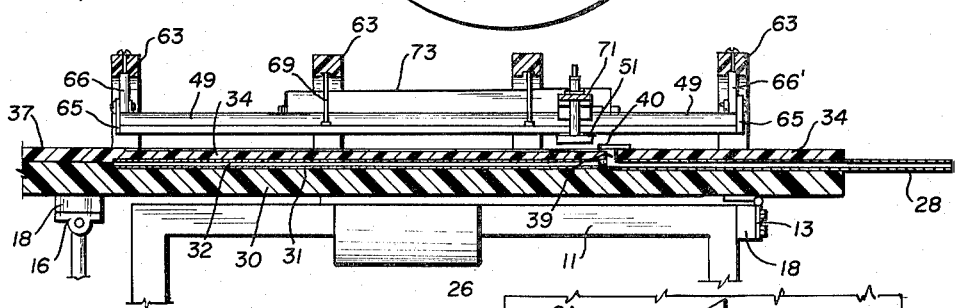
FIG. 4
FIG. 6
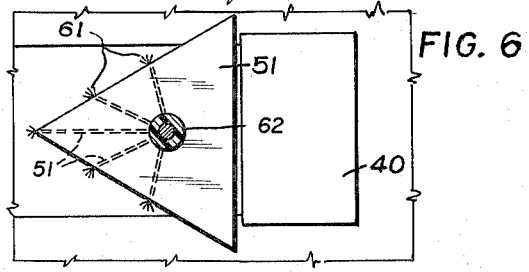
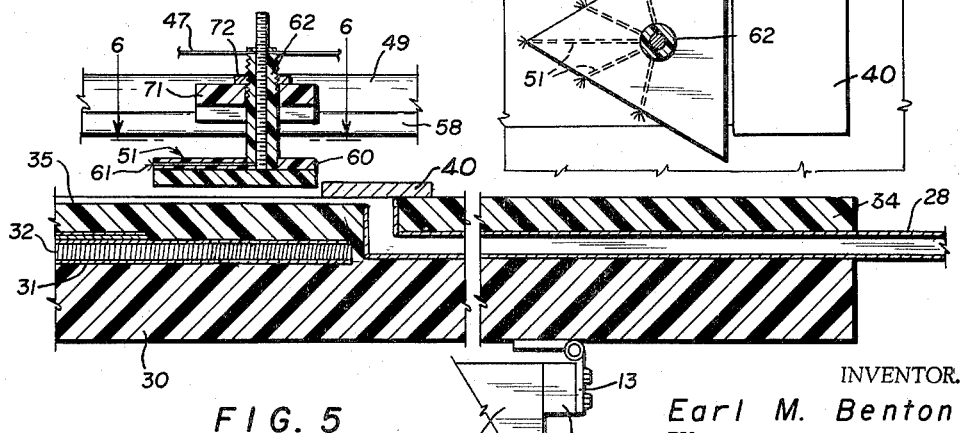
FIG. 5
INVENTOR.
Earl M. Benton
BY WHITEHEAD, VOGL & LOWE
PER *Frank C. Lowe*
ATTORNEYS Nov. 16, 1965 E. M. BENTON 3,217,880
ELECTRO-SEPARATOR FOR SEPARATION OF DRY COMMINUTED MATERIAL
Filed Aug. 10, 1962 3 Sheets-Sheet 3
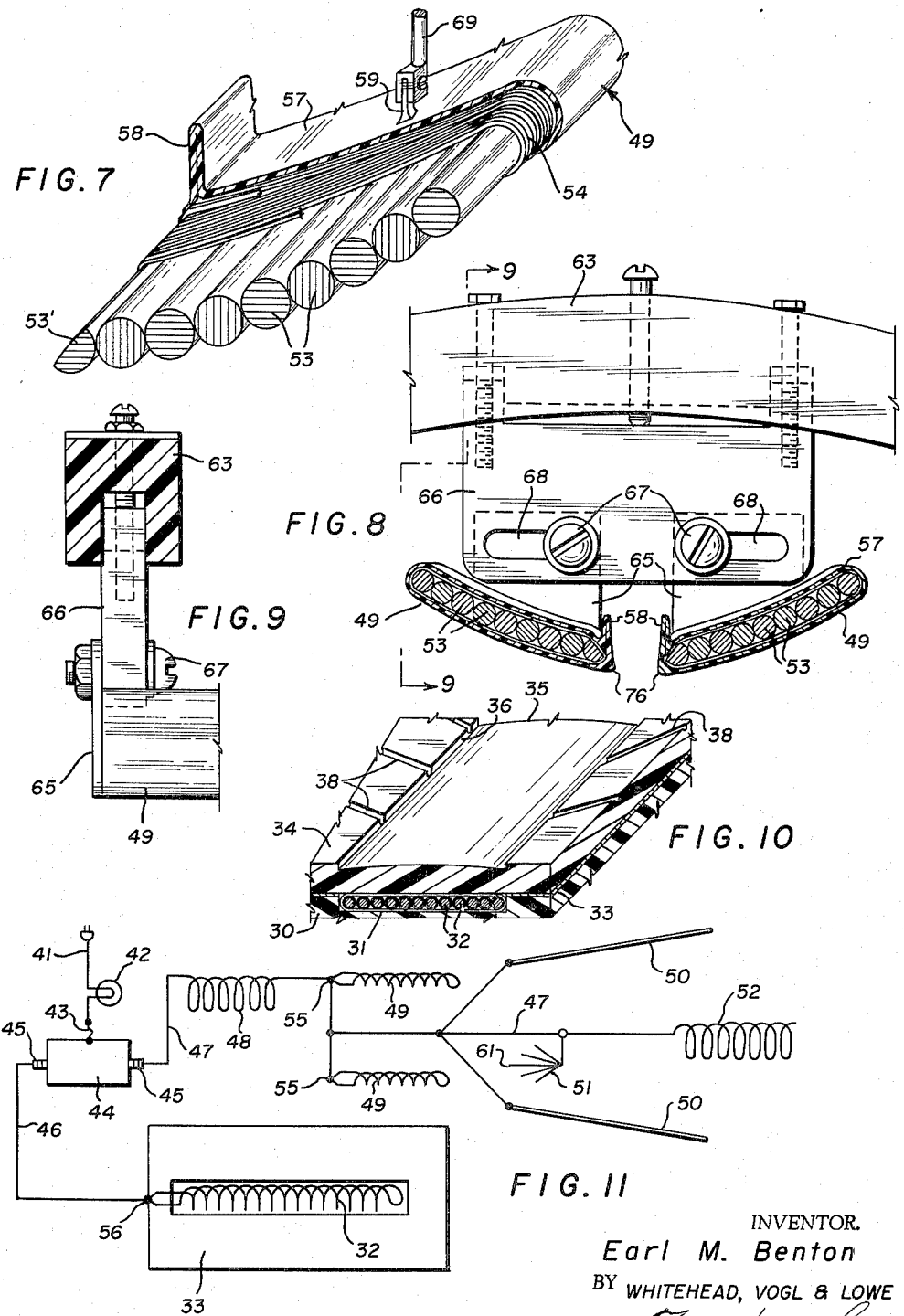
INVENTOR.
Earl M. Benton
BY WHITEHEAD, VOGL & LOWE
PER Frank C. Lowe
ATTORNEYS United States Patent Office 3,217,880
Patented Nov. 16, 1965

3,217,880
ELECTRO-SEPARATOR FOR SEPARATION OF
DRY COMMINUTED MATERIAL
Earl M. Benton, 3615 Moore Ave., Cheyenne, Wyo.
Filed Aug. 10, 1962, Ser. No. 216,176
17 Claims. (Cl. 209—130)

This invention relates to the separation and classification of dry comminuted material and more particularly to apparatus which employs electromotive excitation as the prime activator in separation and classification of the particles of comminuted material.

The invention is especially adapted for dry mineral separation as where metallics are separated from non-metallics and the invention will thus be described with respect to such separation although it is to be understood that such use is not restrictive. The forces acting upon the particles of a comminuted material, as produced by the improved apparatus hereinafter set forth, combined the effects of cyclic electrostatic and electromagnetic fields to better effect and control particle separation. As such, the invention will be hereinafter referred to as an electromotive dry separator, or simply as an electro-separator.

An object of the invention is to provide a novel and improved electro-separator for the separation and classification of comminuted mineral substances which is adapted to flow the material through a cyclic electrostatic and electromagnetic field in a manner which effectively takes advantage of the varying physical characteristics of the mineral particles to effect a separation as of metallic ore particles from non-metallic gangue particles, and also if desired, from heavy magnetic-responsive gangue particles such as, for example, the separation of gold from black sand.

Another object of the invention is to provide a novel and improved apparatus for the electro-separation of dry comminuted material which is easily adjustable to take advantage of one or more of the several physical characteristics of the component particles of the material, for separation and classification thereof, including variations of density, size, conductivity, magnetic response, surface configuration and the dielectric characteristics of the individual particles.

Another object of the invention is to provide a novel and improved electro-separator for the separation and classification of dry mineral particles which conbines cyclic electrostatic and electroinductive effects with a gravitationally controlled arrangement for material flow to rapidly move a stream of particles through the apparatus and with bifurcation of the flow into classes, as for example, into a stream of metallic ore particles and non-metallic gangue particles.

Another object of the invention is to combine in an electro-separator apparatus wherein high voltage electrostatic charges are created between electrodes, an electroinductive effect which permits substantial increases in the operative voltage to be applied to the apparatus without arcing or otherwise breaking down the electro-induced fields at certain critical sections of the apparatus.

Further objects of the invention are to provide a novel and improved electro-separator which is especially adapted to separate metallic and conductive particles from non-metallic and non-conductive materials; which may be used to effectively obtain concentrates from up-graded material; which is easily adjusted to effectively operate with various types of material; and which is an easily constructed, easily maintained, low cost, rugged and durable unit.

With the foregoing and other objects in view, all of which more fully hereinafter appear, my invention comprises certain improved constructions, combinations and arrangements of parts and elements, as hereinafter described, defined in the appended claims and illustrated in preferred embodiment in the accompanying drawing, in which:

FIGURE 3 is a fragmentary, transverse, sectional portion of the apparatus as taken from the indicated line 3—3 at FIG. 2 but on an enlarged scale.

FIGURE 4 is a fragmentary, longitudinal sectional portion of the apparatus as taken from the indicated line 4—4 at FIG. 2 but on an enlarged scale.

FIGURE 5 is a fragmentary, longitudinal sectional portion substantially the same as the showing at FIG. 4 but on a further enlarged scale and with portions being broken away to otherwise conserve space.

FIGURE 6 is a plan view of a control element as taken substantially from the indicated line 6—6 at FIG. 5 but on a slightly enlarged scale.

FIGURE 7 is a fragmentary perspective view of an electrode, and with portions of elements being broken away and being in section to show parts which would be otherwise hidden from view.

FIGURE 8 is a fragmentary transverse sectional portion as taken from the indicated line 8—8 at FIG. 2 but on a greatly enlarged scale.

FIGURE 9 is a fragmentary sectional detail as taken from the indicated line 9—9 at FIG. 8 but on a further enlarged scale.

FIGURE 10 is a fragmentary portion, in perspective, of the surface channel as viewed somewhat from the indicated arrow 10 at FIG. 3 but on an enlarged scale.

FIGURE 11 is a general circuit diagram illustrating how the several component circuits are wired for a combined electrostatic electroinductive action.

Figure 1:
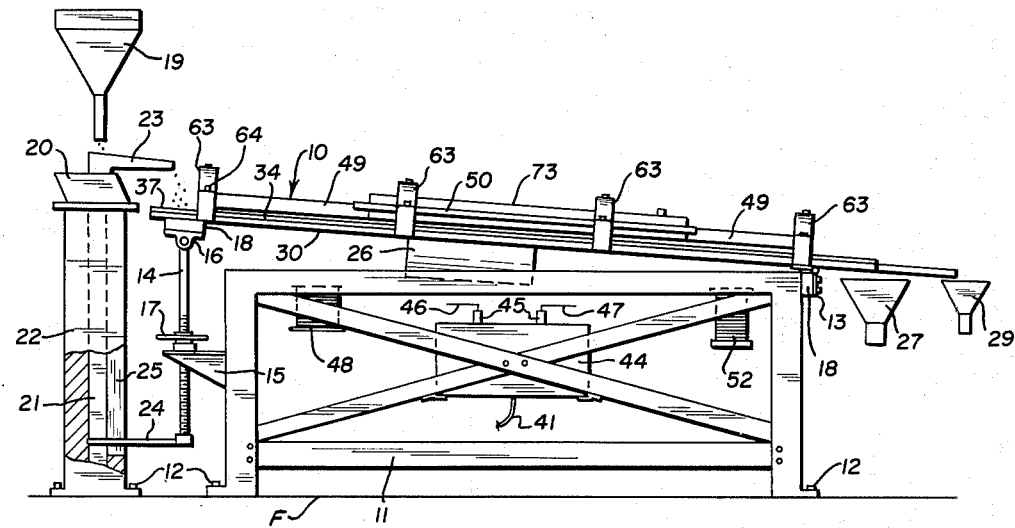
FIGURE 1 is a side-elevational view of my improved electro-separator apparatus, with certain conventional components thereof being illustrated in a diagrammatic manner.
Figure 2:
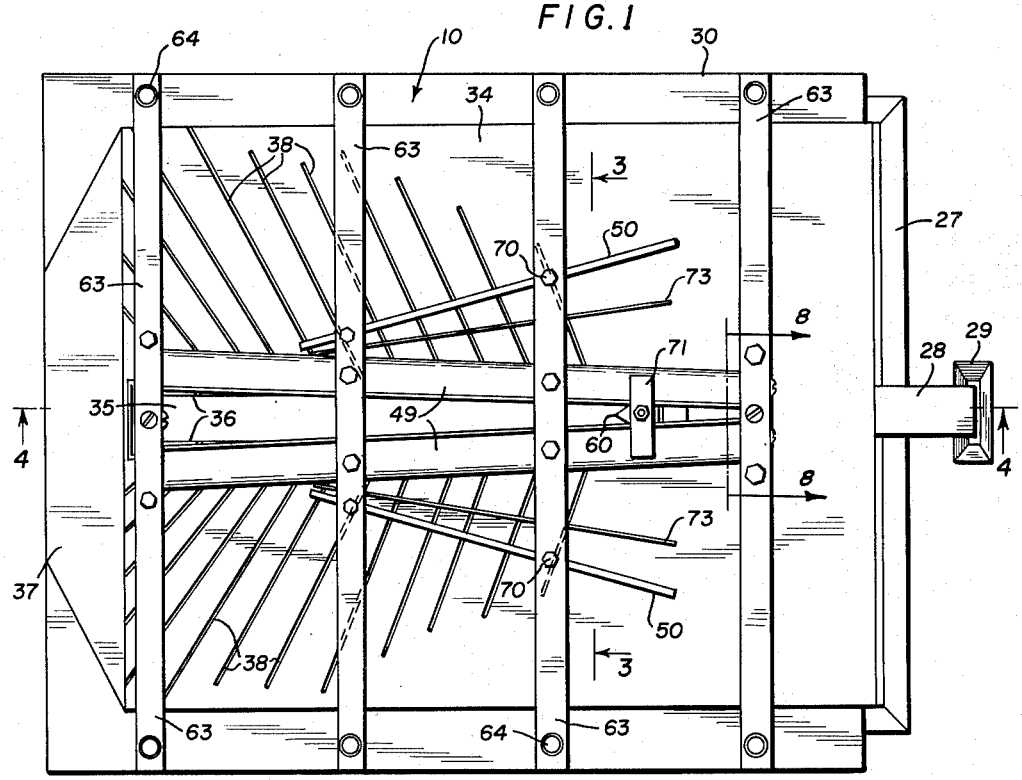
FIGURE 2 is a plan view of the primary portion of the apparatus.

The art of separating different types of particles in dry comminuted material is often difficult because of the many variables in the characteristics of the components forming the material. One general mode for separating comminuted material is by electrostatic methods which appear to be effective with certain types of material and especially in materials where the particle size is uniform. However, it has been observed that simple electrostatic apparatus, as where a voltage is applied to spaced, flat plate-like electrodes, is often inefficient and even ineffectual in the separation operations. It may be especially inefficient insofar as productive capacity is concerned. One basic problem is the fact certain critical limitations exist in that there is a limitation in the voltage which may be used with such apparatus without arcing or creating a corona effect and losses into the air. This, in turn, creates a space limitation between which the electrodes may be set in order to be effective, which, in turn, creates other limitations.

A further problem lies in the manner in which the material is moved through the electrodes in that generally, conventional apparatus relies upon an electrostatic action to create a turbulence within the particle mass by expending a substantial amount of energy for this action without directing the energy towards separation actions.

With such in mind, the present invention was conceived and developed, and comprises, in essence, a unique electrode arrangement wherein a controlled, variable field may be produced and with the electrodes being constructed to produce what is apparently an inductive action combining with the electrostatic field an electroinductive effect which, though the action is not fully understood, apparently permits a substantial increase in the voltage intensity of the electrodes without breakdown.

Another phase of the invention combines a cyclic electro-activity with a physical vibration of the particles as they flow through the electro-field all to produce increased separation effectiveness in a manner which permits a high rate of productivity.

Referring more particularly to the drawing, my improved electro-separator is essentially built upon and about a flat rectangular table 10 whose longitudinal dimension in the direction of material movement, is preferably greater and may be half again as great as the transverse width of the unit. This table 10 is mounted upon a suitable box-like framework 11 which is necessarily affixed to a floor F as by foot lugs 12 to insure stability in operation of the unit.

The table is inclined in the longitudinal direction to facilitate material flow thereover and this inclination is adjustable to obtain an optimum flow condition for any given material treated. To facilitate such adjustment of the inclination of the table, the discharge end is connected to the edge of the framework 11 by a hinge 13 at the underside of the table. The opposite material-receiving end of the table is held above the framework by a centered post 14 which upstands from a suitable bracket 15 outstanding from the framework 11. The upper end of this post is pivotally secured to the underside of the table as in a bearing 16.

The post 14 is cylindrical in form with the lower portion being threaded and extending downwardly through an internally threaded adjustment wheel 17 on the bracket 15. This mode of adjustment will raise or lower the front material-receiving end of the table to obtain any selected downward slope of the table.

Because of the vibrational action of the table as hereinafter described, a pad 18, which may be resilient, may be interposed between the hinge 13 and the framework 11 and between the bearing block 16 and the undersurface of the table as illustrated at FIG. 1.

In operation of this unit, it is contemplated that a comminuted material will be supplied to a hopper 19 of any type which will feed out the material at a fairly constant rate of flow. This hopper is located above and adjacent to the infeed edge of the table. From the hopper 19 the material will fall onto a vibrator-feeder 20 which is mounted upon the inner leg 21 of a telescopically extendible upright 22 adjacent to the table. This upright 22, in turn, is secured to the floor F as by foot lugs 12. The vibrator feeder 20 is a conventional type and includes an outstanding discharge lip 23 which overhangs the infeed edge of the table 10, as clearly illustrated at FIG. 1.

It is necessary to hold the feeder 20 at a selected height above the table regardless of other adjustments, and to facilitate such positioning by moving the feeder 20 in unison with the table, an arm 24 connects the inner leg 21 with the post 14, the upright 22 having a longitudinal groove 25 wherein the arm 24 extends.

A mechanical means for moving the material received at the forward end of the table across the table and to the discharge end thereof is effected by a vibrator 26 conveniently located at the underside of the table. The vibrator is of a conventional type which initiates suitable longitudinally directed reciprocatory movement to the table surface in such a manner as to cause the particles to flow along the table at a substantially constant rate almost as if they were a liquid, and with the rate of flow being regulated by the intensity of the vibrations and by the downward slope of the table.

Material will be discharged from the lower end of the table with tailings or gangue dropping over the edge of the table into a disposal hopper 27. Concentrates are discharged from a chute 28, hereinafter further described, and into a retainer hopper 29, the hoppers 27 and 29 being illustrated somewhat diagrammatically at FIG. 1.

The table 10 is built of a non-conductive ceramic or plastic material such as a rigid nylon or ceramic plate 30 which is of sufficient thickness to provide structural rigidity to the unit. A central longitudinally-disposed slot 31 is formed in the upper surface of this plate, and major portion of this slot, commencing near the forward material-receiving end of the table accommodates an inductance core coil 32, hereinafter described. The remainder of the slot 31, at the opposite discharge end of the table forms a passageway for the concentrate discharge chute 28. The upper surface of this plate 30, at each side of the slot 31 is covered with a copper sheet 33 which forms an electrostatic electrode and operates in combination with the inductance core 32 as hereinafter described. The slotted plate 30 holding the copper electrode sheet 33 and the core coil 32 is covered with a single sheet of ceramic or plastic insulated material to form a surface plate 34 whereon the material flows. This surface plate 34 is necessarily of a smooth surface to permit particles to easily slide along its surface. It is formed with a central longitudinally-disposed groove 35 along its major portion, commencing near the forward material-receiving end of the table and extending to the entrance of the concentrate disposal chute 28 which is located beyond the lower end of the core coil 32. This groove 35 is crowned at the center to provide well-defined longitudinal side channels 36 at each edge thereof, which facilitate holding concentrates as the concentrates find their way into the groove and flow toward the concentrate discharge chute.

The groove 35 terminates short of the upper end of the surface plate 34 to provide a material-receiving skirt 37 whereon comminuted material dropped from the vibrator feeder 20 may spread and because of the action of the vibrator 26, will spread across a substantial transverse portion of the skirt. This transversely-spread material also moves downwardly along the surface plate 34 by the vibratory action and it is also acted upon by a cyclic electro-field to be agitated as in a manner as hereinafter described to drop all heavy metallic particles. The heavy metallic particles forming the concentrate move toward the center groove 35, and to facilitate this movement the surface of the plate is interrupted by a series of angled slots 38 which converge toward and terminate at the edges of the groove 35.

The groove 35 at the upper surface of the plate 34 appropriately terminates at the entrance of the concentrate chute 28 which is formed as a narrow transversely-disposed opening 39 in the plate 34 to effect communication between the groove 35 at the upper surface of the plate and the chute 29 located in the slot 31, as clearly illustrated at FIG. 5. This opening 39 is covered by a rectangular plate 40 of dielectric material to protect the particles dropping into the opening from further electro-action agitation.

Although the electrical action of the electrode elements involves the use of an open circuit as in a conventional electrostatic apparatus, the present invention employs means to produce an inductive phenomena in combination with electrostatic action. A suitable electrical circuit, as illustrated at FIG. 11 will include a power lead line 41 which may be connected to a conventional 110-volt or 220-volt alternating power supply. This line 41, having overload protective means such as a fuse 42 and resistance 43 extends to a high-voltage transformer 44 of the type which is capable of producing as much as 25,000 volts at the secondary outlet terminals 45.

A base lead 46 extends from one terminal to connect with the inductance core coil 32 and the copper electrode sheet which lie between the base plate 30 and the surface plate 34 of the table. An overhead lead 47 extends from the other terminal 45 to an electrode system opposing the core coil 32 and sheet 33. This system includes an inductance coil 48, and, connected in series therewith, a pair of overhead core coils 49, a pair of electrostatic deflectors 50 a spider electrode 51 and a free-end coil 52.

The inductance coil 48 may be located remote from the electro-action field on the table such as at a convenient position on the frame 11. This coil 48 is suitably wound as to effect a phase shift of the alternating power charge which flows to the core coils 49 and the deflectors 50. The free-end booster coil 52 is also essentially an inductance coil adapted to facilitate increased electro-flow through the lead 47 and this coil 52 may also be located at a convenient position as on the frame 11 underneath the table 10.

The overhead core coils 49 are held above the table, by elements hereinafter described, in an arrangement which places them directly above and at each side of the base core coil 32. The positioning of the overhead core coils, however, may be varied by adjustable mounting means as from a position where they lie in spaced parallelism with the base core coil 32 to a preferable position where they converge towards each other and towards the base core coil with minimum spacing being adjacent preferably transversely inclined somewhat with the inner longitudinal edges being lower than the outer edges thereof.

Each core coil is an elongated essentially flat member the base core coil 32 being proportioned and flattened to fit the slot 31. The overhead core coils 49 are similar in form but are longer and may be arched somewhat from a flat transverse configuration as in the manner clearly illustrated at FIG. 8. A unique core coil construction is used herein, in that the body of each core coil is formed as a plurality of longitudinally-extended iron rods 53 laid side by side and at least two layers of insulated wire 54 is closely wrapped about the rods. Each end of the wrapping wire 54 of each overhead core coil 49 connects at a point 55 on the overhead lead 47 and each end of the wrapping wire 54 of the base core coil 32 connects at a point 56 on the base lead 46.

The lower core coil, 32 being enclosed in the slot 31 of the insulated plates 30 and 34 is effectively protected and insulated. The exposed overhead core coils 49 are appropriately enclosed in an insulating plastic sheath 57 of tough slick plastic material such as Teflon. In shaping this sheath 57 an upstanding lip 58 is formed at the inner edge of the top surface of each overhead core coil 49 to form a channel at the upper surface of each core when the cores are transversely inclined as at FIG. 8. Each sheath is also formed with upstanding spurs 59 at the approximate third points of the core coil for supporting the core coil as hereinafter described.

The electrostatic deflectors 50 are simple elongated bars which may be channel-shaped in section as shown at FIG. 3, or they may be otherwise formed. They are likewise supported above the table by means hereinafter described, in a longitudinally-disposed diverging arrangement with a deflector 50 being disposed outwardly from each side of an overhead core 49. These deflectors 50 are located at the central portion or reach of the table 10 with the ends adjacent the material-receiving end of the table, being positioned near the core coils but with the divergence placing the opposite ends outwardly from the core coils at a substantial space.

The spider electrode 51 is located over the groove 35 immediately ahead of the cover plate 40. It is formed as a triangular fan of individual electrode wires which are embedded in a flat plastic, dielectric foot 60 which is preferably triangular in form with the apex point being above the groove and being directed into the flow of the material. The wires of the electrode 51 extend through this foot 60 to project from the apex point of the triangular form and from the sides thereof as short frayed ends 61. This foot 60 is mounted at the base of a support post 62, which upstands therefrom to adjustably connect with supporting means hereinafter described, the supporting means permitting the foot 60 to be spaced any selected distance above the groove 35 to provide a delicate and effective adjustment of the electrical action in front of the entrance of the concentrate chute 28 to impose an especially effective separation action to separate the tailings from the valuable minerals which drop into the concentrate chute.

To support the overhead core coils 49, the electrostatic deflectors 50 and the spider electrode 51 above the table, several insulated, transversely-disposed arches 63 are mounted upon the table. In the preferred arrangement as illustrated, four arches are used including an end arch at each end of the table and intermediate arches at the approximate third-points of the table. These arches are fastened to the table as by connectors 64 at each side edge thereof.

The overhead core coils 49 are of a length which corresponds with the spacing of the end arches, and a bracket 65 upstands from each end of each core. An end block 66 or 66' is affixed to the underside of each end arch to depend therefrom and the brackets 65 are connected to the end blocks as by a connective screw 67 which extends through adjusting slots 68 in the blocks 66 and 66'. It is to be noted that the block 66 at the material-receiving end arch is substantially wider than the block 66' at the opposite end arch to permit a convergence of the cores, as hereinbefore described. The intermediate locations of the core coils 49 which are underneath the intermediate arches, are connected to the intermediate arches by rods 69 which depend from the arches and are attached to the spurs 59, as clearly illustrated at FIG. 3 and FIG. 7.

The electrostatic deflectors 50 are connected to the intermediate arches by suitable threaded bolts 70 which extend downwardly through the arches and into suitable threaded openings 50' in the deflectors to permit vertical adjustments thereof, it being contemplated that the electrostatic deflectors will remain at a selected diverging position but will be adjustable vertically as by turning the bolts 70.

The post 62 supporting the spider is supported upon a flat, transversely-disposed plate 71 which in turn is suspended upon the overhead core coils 49 directly above the discharge chute entrance, the plate 71 being affixed to the upper surfaces of the core coils 49 in any suitable manner. The upper end of the post 62 is threaded to receive an adjustment nut 72 and this post slidably extends through a suitable orifice in the plate 71 to permit vertical adjustment of the sub assembly by the nut 72.

A vertically-disposed insulating curtain plate 73 is mounted on the intermediate arches 63 to depend between each overhead core coil 49 and the adjacent electrostatic deflector 50. These curtains are affixed to the underside of each arch as by a connector clip 74 and extend downwardly to touch the upper surface of the surface plate 34. The lower edge of each curtain shield 73 is formed as a dished channel 75 adapted to catch and retain particles striking either side of the curtain shield, and to permit and facilitate the flow of such particles towards the discharge end of the chute, particles striking this shield being invariably tailings particles.

To operate the apparatus, the electrical system is energized at high voltage and the feeder 20 and table vibrator 26 is started. As the material is dropped from the lip 23 to strike and be spread on the skirt 37, the smooth flow of particles from the lip will appear to explode as the particles move into the area between the core coils 49 to rise above the table and spread laterally. A substantial portion of the gangue particles will fall into the groove at the top surface of the core coils 49 formed by the lip 58 to be quickly discharged from the apparatus. Other particles will spread or converge, depending upon their nature, with gangue particles being also diverted by the curtain channels 75. Heavy particles will be diverted by the slots 38 to move into the side channels of groove 35, and thence, into the channel.

As the material approaches the discharge chute, the magnetic effect of the core coils 49 begins to act by groove 35. This action can be controlled and varied to any desirable extent by changing the gap between the core coils 49 and the spacing of the cores from the table surface.

In operation of this unit, it was demonstrated that the electro-action was more than a simple electrostatic, or capacitance effect and that, even though the circuits 46 and 47 were open, an inductive action occurred. For example, the iron rods 53 were magnetized in an unusual manner, with the residual magnetism being positive at the center of the rods and negative at the ends thereof. Also, it was observed that when operated under high voltage, the spacing between the core coils 32 and 49 could be much closer than the spacing of simple electrostatic plates under comparable conditions. For example, the core coils could be spaced less than ¼-inch above the groove 35 without sparking while under the same voltage and under the same comparable conditions, the electrostatic electrodes could not be brought closer than one inch apart without sparking. This action suggested that in some manner a very intense field was being created at the region of the groove 35 between the base core 32 and the overhead cores 49. In operation of the unit it was found that this apparent action could be further intensified to an observable degree by flattening the inner edge rod 53' of each overhead core coil as illustrated at FIG. 7, to provide a somewhat pointed lower inner edge 76 of the overhead electrodes.

It was observed that when comminuted material was flowed through the apparatus, the particles were definitely and clearly divided into two streams, the major stream being the tailings of quartz and similar particles which appeared to have no resistance to electrostatic or electro-inductive action, while a smaller stream of concentrates effectively found their way into the concentrate chute. Even when operated with a heavy flow of particles there was a violent agitation of the particles with quick separation of heavier metallic particles. The apparatus was especially effective in separating heavy metallics such as gold, silver or platinum, for neither electrostatic nor electro-inductive action has any effect on these metals.

I have now described my invention in considerable detail, however, it is obvious that others skilled in the art can devise and build alternate and equivalent constructions which are within the spirit and scope of my invention. Hence, I desire that my protection be limited, not by the constructions illustrated and described, but only by the proper scope of the appended claims.

I claim:

1. Apparatus for the separation and classification of the particles of a comminuted material having gangue particles responsive to electrostatic and electromagnetic forces and concentrate particles which are substantially inert to such forces, and comprising in combination:
   (a) means for providing a substantially steady flow of material;
   (b) an inclined table adapted to receive the particle flow at its upper end and to discharge the same from its lower end;
   (c) a coil means associated with the table, including a coil extended above the table adapted to generate an electromagnetic field traversing the path of particle flow across the table;
   (d) a plate means associated with the table, including a flat conductive plate underneath the table adapted to generate an electrostatic field traversing the path of particle flow across the table;
   (e) means, including a pair of leads, with one lead being connected to said coil and the other lead being connected to said plate, for imposing an alternating high voltage potential upon the coil means and the plate means of sufficient intensity to agitate the gangue particles and separate them from the concentrate particles; and
   (f) a longitudinally disposed groove means at the center portion of the table, including a central groove and laterally extended slot means converging to the groove, whereby to gather and move the concentrates toward the groove.

2. In the apparatus defined in claim 1, wherein a portion of said coil means is above the surface of the table, is connected to one said lead and includes a longitudinally disposed core coil formed as a continuous winding upon an iron core, oriented substantially above the groove means, an induction coil in the lead between the first said coil and the voltage impressing means in series therewith, and a second induction coil connected in parallel with the first said coil, and said plate means includes a pair of electrodes connected in parallel with the first said coil with an electrode being disposed at each side of the first said coil.

3. In the apparatus set forth in claim 1, wherein the groove means includes a central crowned groove with laterally-extended inclined slots converging to the groove, and means at the end of the groove adapted to collect the concentrates.

4. In the apparatus defined in claim 1, wherein the coil means includes a longitudinally disposed flat-wound coil formed as a continuous winding upon an inron core.

5. In the apparatus defined in claim 1, wherein the coil means includes at least two longitudinally disposed coils, each being formed as a continuous winding about an iron core, with the first coil being connected with one lead and extending underneath the table, and the second coil being connected with the other lead and extending above the table.

6. In the apparatus defined in claim 1, wherein the coil means includes a longitudinally disposed coil formed as a continuous winding about a longitudinally disposed group of iron rods.

7. In the organization set forth in claim 1, wherein sail coil means includes a longitudinally disposed coil underneath tht table surface substantially directly below said groove.

8. In the organization set forth in claim 1, wherein the coil means includes a flat, longitudinally disposed coil having an iron core therein, disposed underneath the table surface substantially directly below the longitudinal groove.

9. In the organization set forth in claim 1, wherein the plate means includes a flat, conductive surface extending underneath a substantial portion of the table surface and beneath the table surface a flat wound electrode coil beneath the table surface extending underneath the groove portion thereof, and the flat wound, longitudinally disposed coil carried above the table surface, aligned above and approximately parallel with the longitudinal groove.

10. In the organization set forth in claim 9, wherein the coil means includes a pair of longitudinally extended coils superimposed above the longitudinal groove in approximate alignment therewith.

11. In the organization set forth in claim 10, wherein said coils converge in the direction of particle movement from the spaced apart positions at the upper end of the table to closely adjacent positions near the lower end of the groove.

12. In the organization set forth in claim 10, wherein base channels are formed at the upper surface of said coils, adapted to retain gangue particles which are thrown from the surface of the table.

13. In the organization set forth in claim 1, wherein said plate means include a flat conductive surface at the underside of the table and a pair of plate-like members at the upper surface of the table, which diverge from a minimum space at the upper end of the table to a maximum spacing near the lower end of the table.

14. In the apparatus set forth in claim 1, wherein said groove terminates as a disposal chute having an enclosed passageway at an elevation below the surface of the groove and said plate means including an electrode plate above the surface of the groove at the juncture of the groove and the chute, adapted to prevent gangue particles from entering the chute.

15. Apparatus for the separation and classification of the particles of a comminuted material having gangue particles responsive to electrostatic and electromagnetic forces and concentrate particles which are substantially inert to such forces, and comprising in combination:

(a) means for providing a substantially steady flow of material;

(b) an inclined table adapted to receive the particle flow at its upper end and to discharge the same from its lower end;

(c) a longitudinally disposed groove means on the table surface including a longitudinal central groove and laterally extended, downwardly inclined slot means converging to the central groove, whereby to gather and move concentrates to the groove and to the lower end of the table;

(d) means, including a pair of leads, for imposing an alternating high voltage potential, with a first lead extending above the table and a second lead extending beneath the table;

(e) a first coil means connecting with said first lead above the table, including a longitudinally disposed upper core coil formed as a continuous winding about an iron core positioned substantially above the groove, and an induction coil in series in the lead between the said core coil and the voltage impressing means, and a second induction coil connecting with the lead in parallel with the first said coil, and the first said coil being adapted to generate an electromagnetic field traversing the path of particle movement across the table;

(f) a first plate means connecting with said first lead above the table, including a pair of electrodes connected in parallel with the first said coil with an electrode being disposed at each side of the first said coil and being adapted to generate an electrostatic field traversing the path of particle movement across the table;

(g) a second coil means connecting with said second lead below the table including a longitudinally disposed lower core coil formed as a continuous winding about an iron core positioned underneath the surface of the table substantially directly below the groove and being adapted to generate an electromagnetic field traversing the path of particle movement across the table; and (h) a second plate means beneath the surface of the table connecting with said second lead below the table and extending from each side of said lower coil and being adapted to generate an electrostatic field traversing the path of particle movement across the table; and wherein said means for imposing said high voltage potential between the leads is adequate to generate an electromagnetic field in the coil means and an electrostatic field between the said first and second plate means of sufficient intensity to agitate the gangue particles and separate them from the concentrate particles as the material moves down the table.

16. In the organization defined in claim 15, wherein the electrode lead above the surface includes a second longitudinally disposed upper coil formed as a continuous winding about an iron core substantially the same as the first said coil, wherein the said lower coil is disposed directly underneath the said longitudinal groove and each said upper coil is disposed above and alongside said groove and in a mutual spaced apart relation.

17. In the organization defined in claim 15, wherein the electrode lead above the surface includes a second longitudinally disposed upper coil formed as a continuous winding about an iron core substantially the same as the first said coil, wherein the said lower coil is disposed directly underneath the grooved means and each said upper coil is disposed above and alongside the grooved means with a spacing between the said upper coils directly above the grooved means and shiftable mounting means at each end of each said upper coil adapted to vary the spacing between the coils and above the surface according to a selected pattern.

References Cited by the Examiner

UNITED STATES PATENTS

| | | | |
|---|---|---|---|
| 714,256 | 11/1902 | Sutton | 209—127 |
| 794,647 | 7/1905 | Sutton | 209—131 |
| 1,083,172 | 12/1913 | Winnie | 209—131 |
| 1,564,731 | 12/1925 | Weatherby | 209—223 |
| 1,729,589 | 9/1929 | Nordey | 209—223 |
| 2,125,812 | 8/1938 | Robertson | 209—127 |
| 2,705,347 | 4/1955 | Carboretto | 209—127 |
| 2,848,108 | 8/1958 | Brastad | 209—127 |
| 2,848,727 | 8/1958 | Johnson | 209—127 |
| 3,009,573 | 11/1961 | Whipple | 209—130 |
| 3,029,577 | 4/1962 | Hedberg | 209—127 |

HARRY B. THORNTON, *Primary Examiner.*